US010761907B2

United States Patent
Attard et al.

(10) Patent No.: US 10,761,907 B2
(45) Date of Patent: Sep. 1, 2020

(54) SYSTEMS AND METHODS FOR AUTOMATICALLY DETECTING DESKTOP APPLICATIONS TO ACCESS CONTENT WHEN MULTIPLE ACCESS OPTIONS ARE AVAILABLE

(71) Applicants: Atlassian Pty Ltd, Sydney, New South Wales (AU); Atlassian, Inc., San Francisco, CA (US)

(72) Inventors: Samuel Attard, Sydney (AU); Clifton Hensley, Austin, TX (US); Issac Gerges, Austin, TX (US)

(73) Assignees: Atlassian Pty Ltd, Sydney, New South Wales (AU); Atlassian, Inc., San Francisco, CA (US)

( * ) Notice: Subject to any disclaimer, the term of this patent is extended or adjusted under 35 U.S.C. 154(b) by 62 days.

(21) Appl. No.: 16/146,109

(22) Filed: Sep. 28, 2018

(65) Prior Publication Data

US 2020/0104191 A1 Apr. 2, 2020

(51) Int. Cl.
*G06F 9/54* (2006.01)
*H04L 29/08* (2006.01)
*G06F 8/61* (2018.01)
*G06F 21/56* (2013.01)
*H04L 29/06* (2006.01)
(Continued)

(52) U.S. Cl.
CPC .................. *G06F 9/54* (2013.01); *G06F 8/61* (2013.01); *G06F 21/128* (2013.01); *G06F 21/44* (2013.01); *G06F 21/50* (2013.01); *G06F 21/566* (2013.01); *H04L 29/06972* (2013.01);
(Continued)

(58) Field of Classification Search
CPC . G06F 8/61; G06F 9/54; G06F 21/128; G06F 21/44; G06F 21/50; G06F 21/566; H04L 29/06972; H04N 1/32144
See application file for complete search history.

(56) References Cited

U.S. PATENT DOCUMENTS 9,195,809 B1 * 11/2015 Kaplan ................. G06F 21/577
9,443,012 B2 * 9/2016 Roberts .................. G06F 16/95
(Continued)

OTHER PUBLICATIONS

Collin Jackson and Adam Barth. "ForceHTTPS: Protecting High-Security Web Sites from Network Attacks", WWW 2008 / Refereed Track: Security and Privacy—Web Client Security Apr. 21-25, 2008, Beijing, China, 9 pages. (Year: 2008).*

(Continued)

*Primary Examiner* — George C Neurauter, Jr.
(74) *Attorney, Agent, or Firm* — Hickman Palermo Becker Bingham LLP

(57) ABSTRACT

Described herein is a computer implemented method comprising receiving a link to content served by a remote server, detecting activation of the link, and in response to detecting activation of the link attempting to load a passive mixed content item from a local web server. In response to determining the passive mixed content item successfully loaded the method further comprises extracting installed application information from the passive mixed content item, determining whether or not the installed application information indicates a relevant installed desktop application, and if so accessing the content referenced by the link from the remote application server using the relevant installed desktop application.

20 Claims, 7 Drawing Sheets

(51) Int. Cl.
  *G06F 21/44* (2013.01)
  *G06F 21/12* (2013.01)
  *H04N 1/32* (2006.01)
  *G06F 21/50* (2013.01)

(52) U.S. Cl.
  CPC ......... *H04L 67/02* (2013.01); *H04N 1/32144* (2013.01); *G06F 2209/541* (2013.01); *G06F 2209/549* (2013.01)

(56) References Cited

U.S. PATENT DOCUMENTS

| | | | | |
|---|---|---|---|---|
| 9,607,145 | B2* | 3/2017 | Kaplan | G06F 21/577 |
| 9,800,602 | B2* | 10/2017 | Shekyan | G06F 16/958 |
| 9,826,018 | B1* | 11/2017 | Walfish | H04L 67/02 |
| 10,033,755 | B2* | 7/2018 | Shekyan | G06F 21/577 |
| 10,152,590 | B2* | 12/2018 | Liu | G06F 21/53 |
| 10,397,265 | B2* | 8/2019 | Shekyan | H04L 63/1433 |
| 10,412,150 | B2* | 9/2019 | Walfish | G06F 16/95 |
| 2004/0267702 | A1* | 12/2004 | Gallant | G06F 16/9574 |

OTHER PUBLICATIONS

Tealium, "Citrix Web Interface 5.2 Automatic Client Detection and Deployment", https://www.vmadmin.co.uk/citrix/46-presentationserver/192-citrixwiclientdeploy, dated 2016, 4 pages.

CommCell Console Remote Installations, "Installing Commvault by Automatically Detecting the Database Applications", dated Jan. 11, 2018, 4 pages.

* cited by examiner

SYSTEMS AND METHODS FOR AUTOMATICALLY DETECTING DESKTOP APPLICATIONS TO ACCESS CONTENT WHEN MULTIPLE ACCESS OPTIONS ARE AVAILABLE

FIELD OF THE DISCLOSURE

The present disclosure relates to systems and methods for automatically detecting desktop applications.

BACKGROUND

Many modern server applications are designed such that the functions/features provided can be accessed from various client applications.

For example, a given server application may provide for access by a web client (e.g. a web-browser application installed on a mobile or desktop device), a desktop application client (i.e. a desktop application installed on a desktop computer), and/or a mobile application client (i.e. an application installed on a mobile device).

Providing multiple client options provides various benefits. For example, providing a web client allows use of the software application on any computing device with a web browser, regardless of whether a dedicated application (desktop or mobile) has been installed or not. On the other hand, a dedicated desktop or mobile application client may provide greater security, simplified authentication, allow users to access a richer set of features, and/or allow users to access features via a more sophisticated interface than can be provided via a website.

Where a desktop user has installed a dedicated desktop client, the user will typically prefer to use the desktop client over the web client. Automatically detecting whether not a desktop client has been installed, however, is not straight forward.

SUMMARY

The appended claims may serve as a summary of the invention.

DETAILED DESCRIPTION

Figure 1:
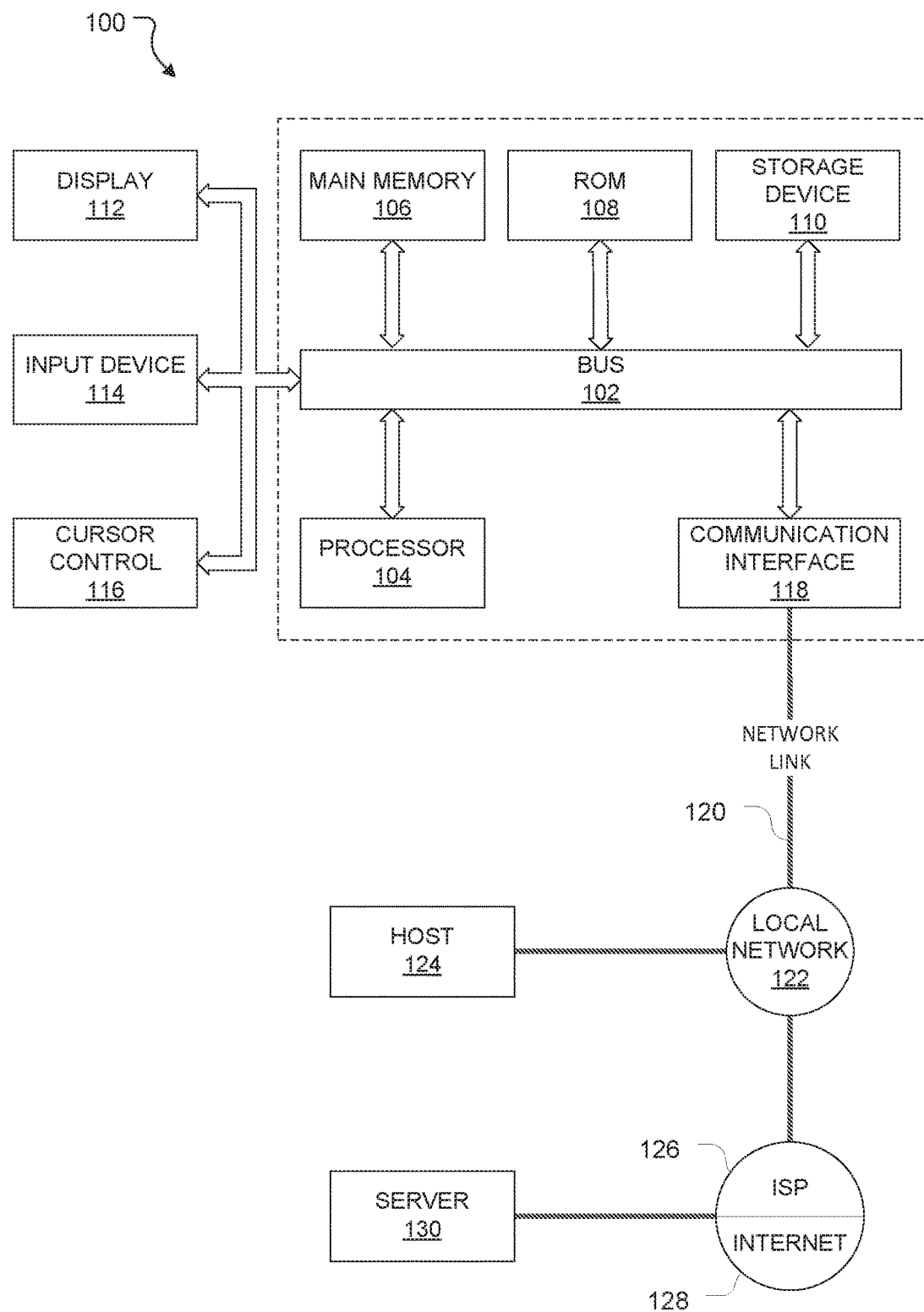
FIG. 1 illustrates an example computer system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessary obscuring.

Overview

As described above, many server applications provide for client-side access via either a web client or a dedicated application client (e.g. a desktop application or a mobile application specifically designed/programmed to interact with the server).

The embodiments described herein are concerned with desktop systems and server applications which provide for client access by both a general web browser application and by a dedicated desktop client application (which will be referred to as a dedicated desktop application). In this context, the term dedicated is intended to distinguish a desktop application configured/installed specifically to interact with a particular application server (e.g. using API calls) from a more general web browser application which can be used to interact with any web server (e.g. using the HTTP/HTTPS protocol).

Furthermore, as used herein a 'desktop' system refers to a system with a desktop operating systems installed thereon (e.g. Windows 10, OSX, or an alternative desktop system). The physical form and hardware of desktop systems is otherwise unconstrained—though typically a desktop system will be a desktop or laptop computer. As used herein, therefore, a desktop application is an application that is installed and runs on a desktop system. This is in contrast to a mobile system which (in the context of this specification) refers to a system running a mobile operating system (such as Android, iOS, Windows Mobile). As with a desktop system, the physical form and hardware of a mobile system is also unconstrained, but would typically be a tablet or mobile phone.

In many cases, interaction with a given server application is triggered via receipt and activation of a link (e.g. a URL) to particular content or functionality provided by the server application. Consider, for example, a user who wishes to share particular video content hosted by a video site (e.g. YouTube) with another user. A common way of doing this is to communicate a link in respect of the content to the other user. The user receiving/viewing the link can activate it which leads the user to the content. As a further example, a user of a collaboration program such as Slack may want to share/direct another user's attention to a particular channel (or particular content item in a channel) and do so by communicating a link that, when activated (and presuming the user has any required access permissions), takes the user to that channel/content item. As yet a further example, a user of a wiki such as confluence may want to share/direct another user's attention to a particular page (or particular content in a page) and do so by communicating a link that, when activated (and presuming the user has any required access permissions), takes the user to that page/content.

The link to the server application content may be communicated in various ways. For example it may be included in an email, an SMS, a chat dialogue, a word processing document, a .pdf document, a spreadsheet, a presentation, a html page, or any other format capable of handling a URL. Similarly, the person receiving the link may view and interact with the link from a variety of applications—e.g. a web browser, a dedicated email client, a SMS viewer, a chat application, a pdf viewer, a word processing/spreadsheet/presentation application, or any other appropriate application.

When a user activates such a link to different scenarios are possible.

If a dedicated desktop application relevant to the link is not installed (e.g. a YouTube desktop application in the case of a YouTube link, a Slack desktop application in the case of a Slack link), client side access must be via a web client (e.g. the YouTube website or Slack website accessed via a web browser).

If a dedicated desktop application relevant to the link is installed, however, the user will typically have the option of either accessing the link via a web client (i.e. web browser) or the dedicated desktop application relevant to the link.

As used herein, a dedicated desktop application relevant to a received link is a desktop application that provides client-side access to the server content indicated by the link.

Where a dedicated desktop application exists—and a user has gone to the trouble of installing that dedicated desktop application—the user will typically prefer to use the dedicated desktop application over the web client. This presents a problem for desktop scenarios—namely how to determine when a dedicated desktop application is available.

One way of addressing this issue is to generate a dialogue box/query which, when a user activates a received link, asks the user if the dedicated desktop application for that link has been installed. If the user responds affirmatively, the dedicated desktop application is launched and the server is accessed via that application. Otherwise, access proceeds via the web client. Presenting the user with a dialogue box such as this, however, is annoying to the user.

The embodiments described herein allow for the automatic and transparent (i.e. without user intervention) identification of whether a dedicated desktop application capable of handling a received link is present and, if so, launching that dedicated desktop application. In this regard two general scenarios will be described in turn: a single application scenario (where there is only a need to be able to transparently identify whether or not a single defined dedicated desktop application has been installed on a desktop system); and a multi-application scenario (where there is a need to be able to transparently identify whether one of a number of defined dedicated desktop applications have been installed on a desktop system).

The embodiments described herein are implemented using one or more computer systems. An example computer processing system will be described with reference to FIG. 1, followed by a description of an example architecture of systems involved in the described embodiments.

Following this, example processes for automatically detecting and launching installed desktop applications will be described, initially with respect to the single application scenario then with respect to the multi-application scenario. For ease of reference, the description follows this outline:

1. Computer system overview
2. Example architecture
3. Single application scenario
   3.1 Dedicated desktop application installation
   3.2 Dedicated desktop application uninstallation
   3.3 Dedicated desktop application independent launch
   3.4 Dedicated desktop application termination
   3.5 Automatic detection/launch of dedicated desktop application
   3.6 Single dedicated desktop application scenario embodiments
4. Multiple dedicated desktop application scenario
   4.1 Dedicated desktop application installation
   4.2 Dedicated desktop application uninstallation
   4.3 Dedicated desktop application independent launch
   4.4 Dedicated desktop application termination
   4.5 Automatic detection/launch of dedicated desktop application
   4.6 Multiple dedicated desktop application scenario embodiments 1. Computer System Embodiments and features described herein are implemented by one or more special-purpose computing devices. The special-purpose computing devices may be hard-wired to perform the techniques described, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, server systems, or any other device/system that incorporates hard-wired and/or program logic to implement the techniques.

For example, FIG. 1 is a block diagram that illustrates a computer system 100 upon which embodiments of the invention may be implemented. For example, each of the desktop systems 210, 220, and 230 and the server system 240 discussed below are separate computer systems such as computer system 100.

Computer system 100 includes a bus 102 or other communication mechanism for communicating information, and a hardware processor 104 coupled with bus 102 for processing information. Hardware processor 104 may be, for example, a general purpose microprocessor (e.g. a CPU) or a special purpose processor (e.g. a graphical processing unit or GPU).

Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions by the processor 104. Such instructions, when stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk, solid state disk, or optical disk, is provided and coupled to bus 102 for storing information and instructions.

Computer system 100 may be coupled, via bus 102, to one or more output devices such as a display 112 for displaying information to a computer user. Display 112 may, for example, be a cathode ray tube (CRT), a liquid crystal display (LCD), a light emitting diode (LED display), or a touch screen display. An input device 114, including alphanumeric and other keys, may be coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. Additional and/or alternative input devices are possible, for example touch screen displays.

Computer system 100 may implement the techniques described herein using customized hard-wired logic, one or more ASICs or FPGAs, firmware and/or program logic which in combination with the computer system causes or programs computer system 100 to be a special-purpose machine. In certain embodiments, the techniques herein are performed by computer system 100 in response to processor 104 executing one or more sequences of one or more instructions contained in main memory 106. Such instructions may be read into main memory 106 from another storage medium, such as storage device 110. Execution of the sequences of instructions contained in main memory 106 causes processor 104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 110. Volatile media includes dynamic memory, such as main memory 106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Computer system 100 also includes a communication interface 118 coupled to bus 102. Communication interface 118 provides a two-way data communication coupling to a network link 120 that is connected to a local network 123. For example, communication interface 118 may be an integrated services digital network (ISDN) card, cable modem, satellite modem, or a modem to provide a data communication connection to a corresponding type of communications or telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 123 to a host computer 124 or to data equipment operated by an Internet Service Provider (ISP) 126. ISP 126 in turn provides data communication services through the world wide packet data communication network now commonly referred to as the "Internet" 128. Local network 123 and Internet 128 both use electrical, electromagnetic or optical signals that carry digital data streams. The signals through the various networks and the signals on network link 120 and through communication interface 118, which carry the digital data to and from computer system 100, are example forms of transmission media.

Computer system 100 can send messages and receive data, including program code, through the network(s), network link 120 and communication interface 118. In the Internet example, a server 130 might transmit a requested code for an application program through Internet 128, ISP 126, local network 123 and communication interface 118.

The received code may be executed by processor 104 as it is received, and/or stored in storage device 110, or other non-volatile storage for later execution.

A computer system as described herein may be configured in a plurality of useful arrangements. In one approach, a data processing method comprises using a computer system, obtaining from one or more non-transitory computer-readable data storage media a copy of one or more sequences of instructions that are stored on the media and which when executed by the computer system processor cause the computer system to perform (either alone or in combination with one or more additional computer systems), the techniques that are described herein.

A computer system may take a variety of forms. For example, a desktop computer system such as system 210, 220 and 230 may be in the form of a desktop computer, a laptop computer, a notebook computer or the like.

2. Example Architecture

Figure 2:
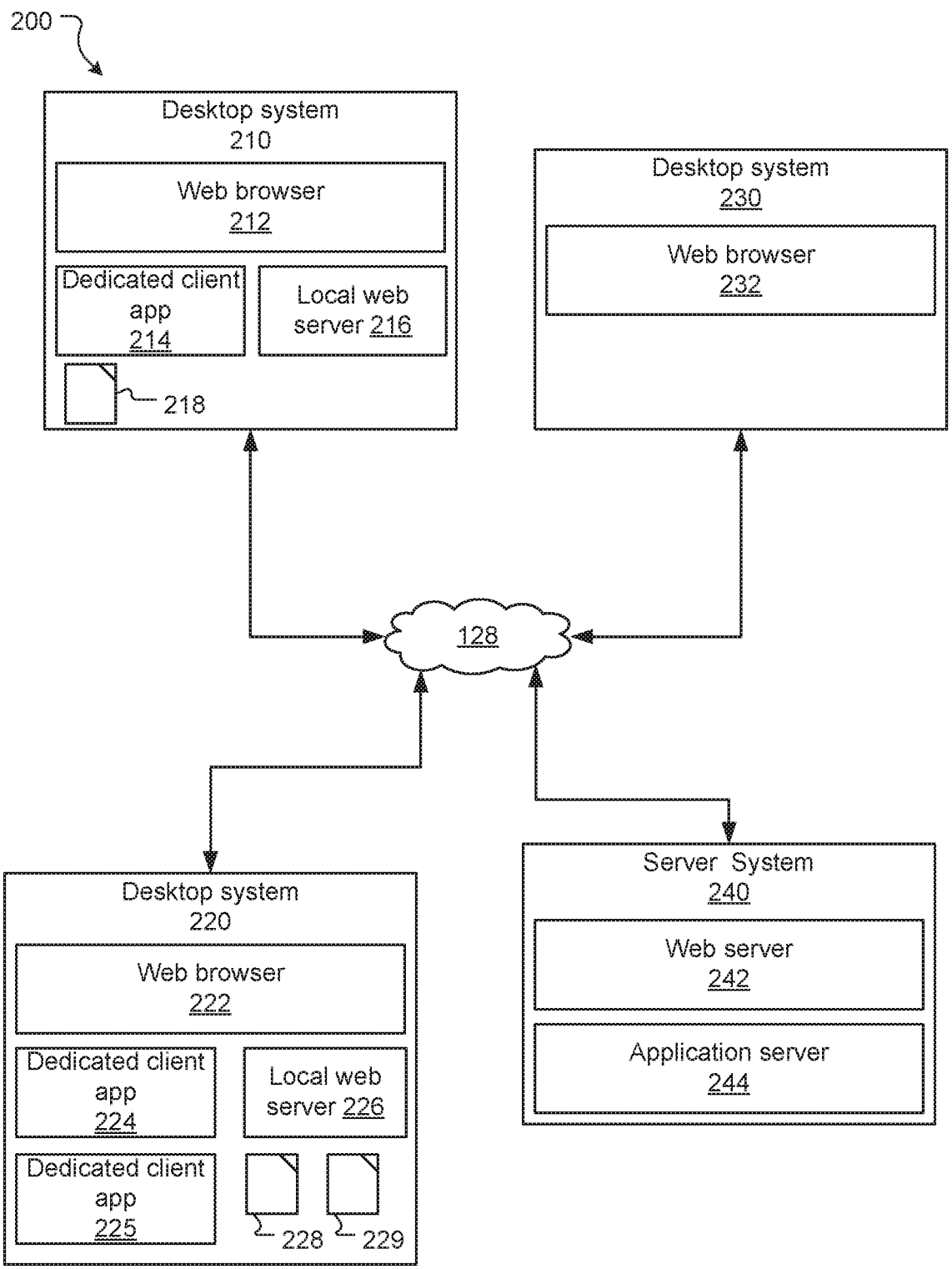
FIG. 2 is a diagram illustrating an example system architecture.

Turning to FIG. 2, an example system architecture 200 is illustrated for the purpose of describing various features and operations of the embodiments. System architecture 200 comprises three desktop systems 210, 220, and 230 and server system 240 interconnected via a network (in this case the Internet 128, however interconnection could be via any other telecommunications network).

Desktop systems 210, 220 and 230 are all computer systems—for example as described above with respect to FIG. 1. As noted above, as used herein, the 'desktop' nature of systems 210, 220 and 230 refers to the fact that each of these systems has a desktop operating system installed (e.g. Windows 10, OSX, or an alternative desktop system). The physical form and hardware of desktop systems 210, 220 and 230 is otherwise unconstrained—though typically they will be desktop or laptop computers.

Desktop systems 210, 220 and 230 all have web browser applications (212, 222 and 232 respectively) installed thereon. Examples of web browser applications include, Chrome, Safari, Internet Explorer, Opera. Generally speaking, web browsers 212, 222 and 232 communicate with web servers (such as remote web server 242 running on server system 240) over the communications network 128 via general world-wide-web protocols (e.g. http, https).

Desktop system 210 has a dedicated desktop application 214 installed thereon. The dedicated desktop application 214 provides client-side functionality for a specific application server—e.g. application server 244 of server system 240.

Desktop system 220 is similar to desktop system 210 with the exception that it has two different dedicated desktop applications installed: a first dedicated desktop application 224 providing client-side functionality for a particular application server (e.g. 244) and a second dedicated desktop application 225 providing client-side functionality for a different application server (not shown).

Each desktop system 210 and 220 further includes a local web server 216 and 226 installed thereon. The installation and operation of these local web servers will be described in further detail below. Any appropriate local web server may be used (e.g. Apache, Microsoft Internet Information Server, and NGNIX by way of example), however in the embodiments described herein the web server 216 is an embedded web/HTTP server embedded in the dedicated desktop application itself.

Desktop system 230 is similar to desktop systems 210 and 220, with the exception that no dedicated desktop applications (nor any local server) have been installed. For the purposes of the present description, therefore, system 230 can access web servers via the web browser client 232 (but cannot access any application servers via their corresponding dedicated desktop applications).

Server system 240 is also a computer system (e.g. as described above with respect to FIG. 1). As a server system, however, system 240 will typically (though not always) have more sophisticated processing capabilities and memory resources than a non-server system. Server system 240 includes a web server 242 which allows the server system 240 to serve web pages/content in response to requests from a client web browser such as 212/232. Web server 242 may be any appropriate web server, e.g. Apache, Microsoft IIS, NGNIX, or an alternative web server. Web server 242 will be referred to as a remote web server, remote in the sense that it is typically accessed remotely from a system such as desktop system 210, 220 or 230 (and to distinguish web server 242 from the local web servers that are installed on desktop systems 210 and 220).

Server system 240 further includes an application server 244 which provides a programmatic interface to a dedicated application running on a client system (e.g. dedicated desktop application 214 running on system 210).

Additional systems would typically be involved in architecture 200. For example, multiple server systems 240 may operate in parallel to serve multiple client systems (desktop or otherwise). By way of further example, server system 240 would typically also access one or more database servers to store and retrieve content to/from.

Furthermore, the client-server application in question may be any appropriate client/server application. For example, and as discussed, the client-server application may be Slack, in which case any appropriate web browser 212 may be used, the dedicated desktop application 214/224 will be the Slack desktop client application, and server system 240 will be the Slack server system(s). Alternatively, if the client-server application is Jira, the dedicated desktop application (e.g. desktop application 225) will be the Jira desktop client application.

3. Single Dedicated Desktop Application Scenario

As noted above, the single application scenario is a scenario in which there is only a need to be able to transparently identify whether or not a single defined dedicated desktop application has been installed on the desktop system. For illustrative purposes, this embodiment will be described with reference to desktop system 210.

3.1 Single Application Scenario: Application Installation

Figure 3:
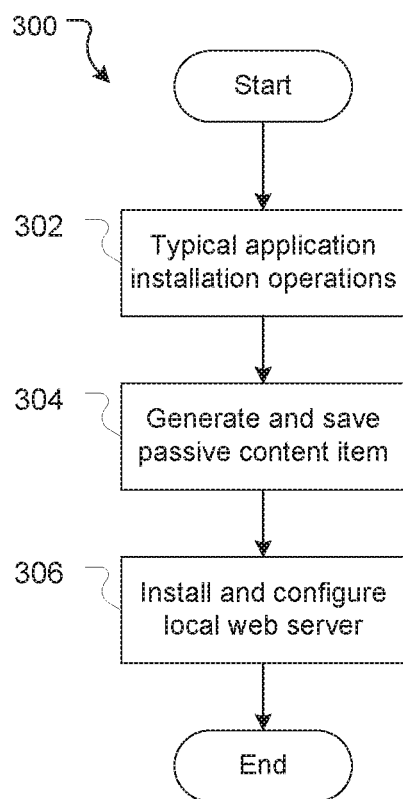
FIG. 3 is a flowchart illustrating processing involved in installing a dedicated desktop application in accordance with certain embodiments.

Turning to FIG. 3, a process 300 by which a dedicated desktop application such as application 214 is installed will be described. The executable code for the application (i.e. execution of which causes the installation process to commence and that controls the installation process) may be provided to desktop system 210 in any appropriate manner—e.g. over a communication network or via a memory device/disk. The installation operations are typically controlled by an installation program and process 300 will be described accordingly.

At 302, typical installation operations for installation of the dedicated desktop application are performed. These operations will depend on (and be controlled by) the application in question (or its installation application), but generally involve generating/saving files and data required by the application in specific locations (specified by the end user or original programmer), creating registry entries in respect of the application, and creating launch links for the application (e.g. on a desktop or start menu).

At 304, the installation program generates a passive mixed content item 218 saves the passive mixed content item 218 to memory accessible by the desktop system 210—e.g. local storage device 110—in a defined passive mixed content location (for example "c:/installed_app", however any location can be used).

Passive mixed content items are content items that certain web browsers will allow to be included/served in a secure web page (i.e. a web pages served over the HTTPS protocol) even though the passive mixed content item itself is served over a non-secure protocol (i.e. the HTTP protocol). For certain web browsers, passive mixed content is an exception to the generally enforced mixed content rules that prevent a web browser from accessing/displaying non-secure content (i.e. content over a non-secure HTTP protocol) in a secure page (i.e. a page served over a secure HTTPS protocol). Examples of types of passive mixed content items include image items, audio items, video items, and object items. It is noted that not all web browsers allow for passive mixed content as an exception to mixed content rules (e.g. some older versions of Internet Explorer). In order to perform the embodiments described herein a web browser that does allow for passive mixed content must be used.

The installation program may be configured to generate and save any appropriate passive mixed content item at 304. As described further below, in the single application scenario it is the existence or otherwise of the passive mixed content item (rather than any particular content of that item) that is relevant. As one example, the passive mixed content item generated and saved can be an image, and any particular image may be used (for example a photograph, an image of a corporate or product logo/trade mark, or a single pixel image).

At 306, the installation program causes a local web server 216 to be installed and configured on the desktop system 210. As noted above, any appropriate web server application may be used and installation of the web server application will be per its normal installation process. The installation program configures the local web server 216 to serve the passive mixed content item 218 generated and saved at 304. In certain embodiments, the local web server 216 is bound to the loopback address (127.0.0.1) so no other machines on the local network can access the server 216.

Installation process 300 is then complete.

3.2 Single Application Scenario: Application Uninstall

Figure 4:
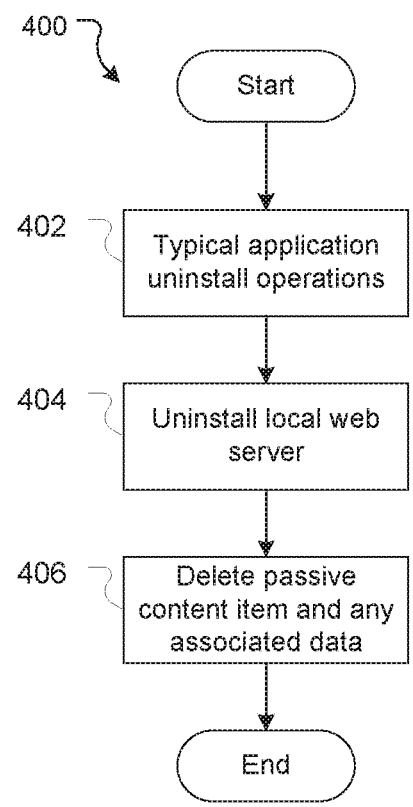
FIG. 4 is a flowchart illustrating processing involved in uninstalling a dedicated desktop application in accordance with certain embodiments.

Turning to FIG. 4, an uninstall process 400 performed when (and if) a user uninstalls dedicated desktop application 214 will be described. Once a command to uninstall application 214 has been received, the uninstall operations are typically controlled by an uninstaller and process 400 will be described accordingly.

At 402, typical uninstallation operations for uninstalling of the dedicated desktop application 214 are performed. These steps will depend on the application in question, but typically involve deleting files and data that were created on installation, removing registry entries, and removing any launch links for the application.

At 404, the uninstaller uninstalls the local web server 216.

At 406, the uninstaller deletes the passive mixed content item 218 generated and saved as part of the installation process (along with any associated data—e.g. any directory that may have been created to store the passive mixed content item in).

Uninstallation is then complete.

3.3 Single Application Scenario: Independent Application Launch

Figure 5:
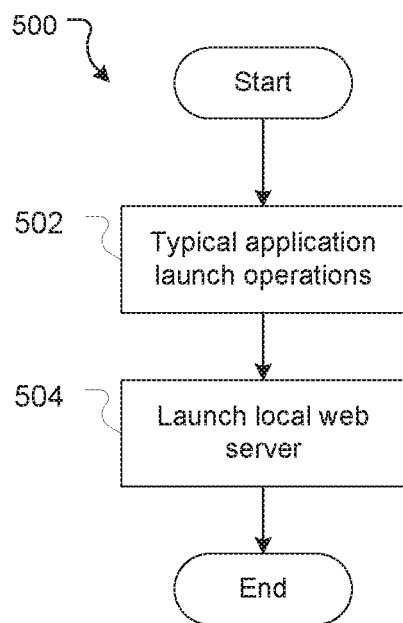
FIG. 5 is a flowchart illustrating processing involved in independent launch of a dedicated desktop application in accordance with certain embodiments.

Turning to FIG. 5, operations performed when a dedicated desktop application 214 is independently launched will be described. In this context, independent launch is intended to distinguish over launch of the dedicated desktop application 214 in response to automatic detection that the application exists (as described below). Independent launch of application 214 may be by various means, for example in response to a user action (e.g., activation a menu item or desktop icon which initiates the launch process) or an automated process (e.g. an application launch command may automatically be initiated on startup or login). Once a command to launch application 214 has been received, the launch operations are controlled by application 214 itself.

At 502, typical operations involved in launching the dedicated desktop application 214 are performed. This will depend on the specific application in question, but will typically result in a user interface for the client application being generated displayed, a connection with the application server 244 being created, any required user authentication being performed, and any relevant data being uploaded to/downloaded from the application server 244.

At 504, the application causes the local web server 216 to also be launched. In certain embodiments, the local web server is bound to 127.0.0.1 to ensure it cannot be hit remotely. Launch of the local web server 216 may be in the background and its launch and running entirely transparent to the user. Once the local web server 216 has been launched it can receive and respond to requests to serve the passive mixed content item 218.

The application launch is then complete, with the user able to interact with the client application 214 as normal.

In other embodiments, the desktop system 210 may be configured to launch the local web server 216 automatically. For example, and where the local web server 216 is embedded with a desktop application, the operating system running on the desktop system 210 could be configured to automatically launch the desktop application on start-up or log-in but in a mode that suppresses the normal user interface thereof. This causes the local web server to be launched transparently and to effectively run in the background until (and if) needed. This automatic launch configuration could be performed during installation of the dedicated desktop application (either automatically or in response to a user's confirmation to do so), or as a settings option accessible from the desktop application 214 itself.

3.4 Single Application Scenario: Application Termination

Figure 6:
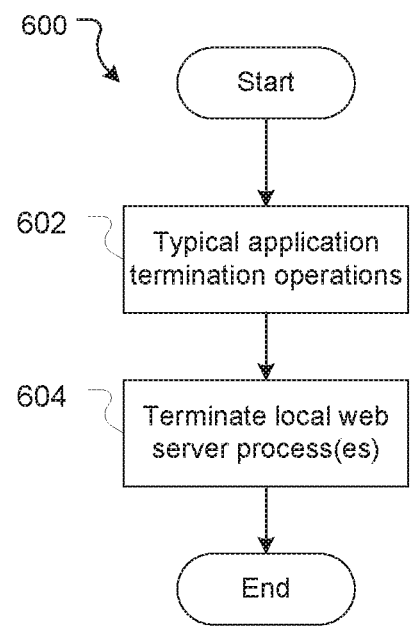
FIG. 6 is a flowchart illustrating processing involved in termination of a dedicated desktop application in accordance with certain embodiments.

Turning to FIG. 6, operations performed when a dedicated desktop application 214 is terminated will be described. Termination of application 214 may be via a user action (for example, selection of a user interface element to close/exit the application) or automated (for example if the user elects to log off from or shut down the entire desktop system 210). Once a command to terminate application 214 has been received, the termination operations are controlled by application 214 itself.

At 602, typical operations involved in terminating the dedicated desktop application 214 are performed. These will depend on application 214 itself.

At 604, in certain embodiments, the application causes the web server 216 to also be terminated. Termination of the web server 216 process(es) will be as per normal and, as with its launch, entirely transparent to the user.

In alternative embodiments, a user command to terminate the dedicated desktop application 214 does not actually cause the application or embedded local web server 216 to terminate. Rather, it causes any user interface elements of the application to be hidden and appropriate processes terminated, but the application remains open in order to keep the local web server 214 active. This can be advantageous in certain circumstances as it will allow the existence of the dedicated desktop application to be determined even though it has been 'terminated' by the user.

The application termination is then complete.

3.5 Single Application Scenario: Automatic Application Detection

Figure 7:
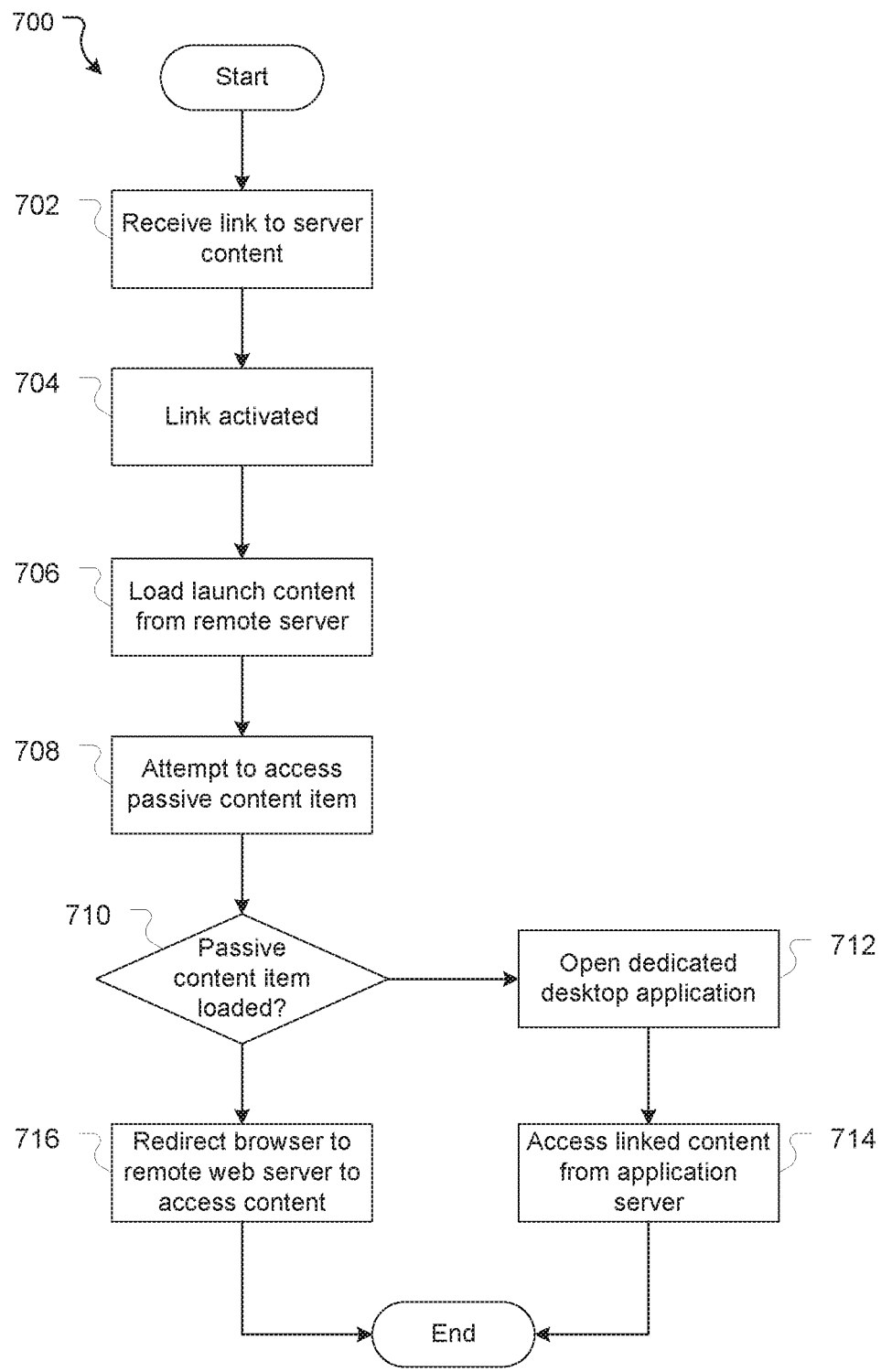
FIG. 7 is a flowchart illustrating processing involved in automatically detecting the installation of a dedicated desktop application in accordance with certain embodiments.

Turning to FIG. 7, operations 700 performed to automatically detect the presence of a particular dedicated desktop application (e.g. application 214) will be described.

At 702, a link to content available from a particular server is received at the desktop system 210. As discussed above, the link will typically be a URL pointing to particular content made available by a remote server (e.g. remote web server 242 and/or application server 244), and may be received in/activated from a variety of applications.

At 704, the link received at 702 is activated—for example by a user clicking or otherwise interacting with the link. If the link is being viewed/activated from a web browser 212, activation causes the web browser to process the link. If the link is being viewed/activated from a different application (e.g. a dedicated email program, a word processor, a pdf viewer or other program) activation causes the operating system of the desktop system to launch or open web browser 212 in order to process the link.

At 706, in accordance with the activated link, the web browser 212 loads launch content from a remote server (e.g. web server 242).

The launch content loaded from the remote server includes a URL to the passive mixed content item 218 and launch logic. The launch logic causes the web browser 212 to: attempt to load the passive mixed content item 218 (at processing block 708); determine whether the passive mixed content item 218 successfully loaded (at 710); and to take action depending on the result of that determination. The launch content includes both a URI which can cause the appropriate dedicated desktop application to be launched in the event that the passive mixed content does load, and a URL pointing to the appropriate web server in the event that the passive mixed content does not load.

The passive mixed content item can only be successfully loaded by the web browser 212 when the dedicated desktop application has been installed on the desktop system 210 (and, as part of the installation, the passive mixed content item 218 generated and the local web server 216 installed and configured to serve the passive mixed content item 218). Furthermore, as the content item 218 is a passive mixed content item it can be served over a HTTP connection even if the content link received at 702 was over a HTTPS connection (provided a web browser 212 allowing such behavior is being used). This means that the local web server 216 does not need to be provided with a valid SSL certificate (which would be required to allow the local web server 216 to serve content over a HTTPS connection).

In certain embodiments, the launch content defines the passive mixed content item as hidden/invisible content: i.e. content that even if loaded does not display.

If, at 710, the web browser 212 determines that the passive mixed content item 218 did successfully load, processing continues to 712. In this case the launch content received from the remote server causes the web browser 212 to launch or open the dedicated desktop application 214. This can be done, for example, by loading an appropriate URI handler for the dedicated desktop application in an iframe.

At 714, the content referenced by the link is accessed from the relevant application server 244 via the dedicated desktop application 214 normally. Processing of the link received at 702 is then complete (with the user able to interact further with the application server 244 via the dedicated desktop application 214).

If, at 710, the web browser 212 determines that the passive mixed content item 218 did not successfully load, processing continues to 716. Failure to load the passive mixed content item 218 indicates that the dedicated desktop application capable of handling the received link has not been installed. Accordingly, at 716 the launch content received from the remote server causes the web browser 212 to redirect to the remote web server 242 which serves the web interface relevant to the content referenced by the link. Processing of the link received at 702 is then complete (with the user able to interact further with the remote web server 242 via the web browser 212).

As can be seen, the operations performed following a user's activation of a received link (at 604) are done without requiring further user interaction, and can all be performed in the background (i.e. transparently to the user). As a consequence, once the user has activated the link at 604 they are automatically directed to either dedicated desktop application 214 relevant to the link if that application is available, or the web interface (through the web browser 212) otherwise. The user is not required to answer any questions and nor is there any chance of the web browser 212 attempting to open a dedicated desktop application that has not been installed (leading to the desktop system 210 hanging or requiring the user to activate a 'cancel' type dialogue box). Furthermore, the operations do not require a secure local web server—i.e. a web server capable of adopting HTTPS encryption (and, accordingly, a web server that does not require a valid SSL certificate).

3.6 Single Application Scenario: Embodiments

Example embodiments relevant to the single application scenario are set out in the following numbered clauses:

Clause 1: A computer implemented method comprising:
receiving a link to content served by a remote server;
detecting activation of the link;
in response to detecting activation of the link, attempting to load, via a web browser application, a passive mixed content item from a local web server;
determining whether the passive mixed content item successfully loaded;
in response to determining the passive mixed content item successfully loaded, accessing the content referenced by the link from a remote application server using an installed dedicated desktop application, the dedicated desktop application configured to operate with the remote application server; and
in response to determining the passive mixed content item did not successfully load, accessing the content referenced by the link from a remote web server using the web browser application.

Clause 2: The computer implemented method of clause 1, wherein accessing the content referenced by the link from the remote application server using the installed desktop application comprises automatically launching the installed desktop application.

Clause 3: The computer implemented method of clause 1, wherein accessing the content referenced by the link from the remote application server using the installed desktop application comprises opening an instance of the installed desktop application that is already running.

Clause 4: The computer implemented method of clause 1, wherein the passive mixed content item is an image.

Clause 5: The computer implemented method of clause 1, wherein successful loading of the passive mixed content item comprises not displaying the passive mixed content item.

Clause 6: The computer implemented method of clause 1, wherein the local web server is a non-secure server and the passive mixed content is served over HTTP.

Clause 7: The computer implemented method of clause 1, wherein the passive mixed content item is generated and saved by the installed dedicated desktop application.

Clause 8: The computer implemented method of clause 1, wherein the local web server is an embedded webserver.

Clause 9: The computer implemented method of clause 8, wherein the embedded webserver is embedded in the installed dedicated desktop application.

Clause 10: The computer implemented method of clause 1, wherein independent launch of the installed dedicated desktop application causes the local web server to be launched.

Further example embodiments extend to systems comprising one or more processors; and one or more non-transitory computer-readable storage media storing sequences of instructions which, when executed by the one or more processors, cause the one or more processors to perform the computer implemented method of any of clauses 1 to 10 above.

Further example embodiments extend to non-transitory computer-readable storage media storing sequences of instructions which, when executed by one or more processors, cause the one or more processors to perform the computer implemented method of any of clauses 1 to 10 above.

4. Multiple Dedicated Desktop Applications Scenario

The single application scenario described above is suitable where there is only a need to determine the existence of one desktop application. Where there is a need to determine the existence of alternative desktop applications, however, the single application processes described above will not be sufficient. This is due to the fact that the single application embodiments rely effectively on a binary condition to determine whether or not the application is installed: the determination at 708 as to whether or not passive mixed content loads or does not. It is not possible to determine from this whether the passive mixed content loaded for a one particular application versus another.

This section describes embodiments which operate to transparently detect whether or not a particular defined dedicated desktop application out of a plurality of defined dedicated desktop applications has been installed on the desktop system. Unlike the single application scenario described above, the embodiments described in this section allow for the automatic detection of multiple defined applications rather than only a single defined application. For illustrative purposes, this embodiment will be described with reference to desktop system 220. While desktop system 220 is illustrated as having two dedicated applications (224 and 225), the processing described in this section can be used to identify whether any number of dedicated desktop applications are installed or not.

4.1 Multi-Application Scenario: Application Installation

Figure 8:
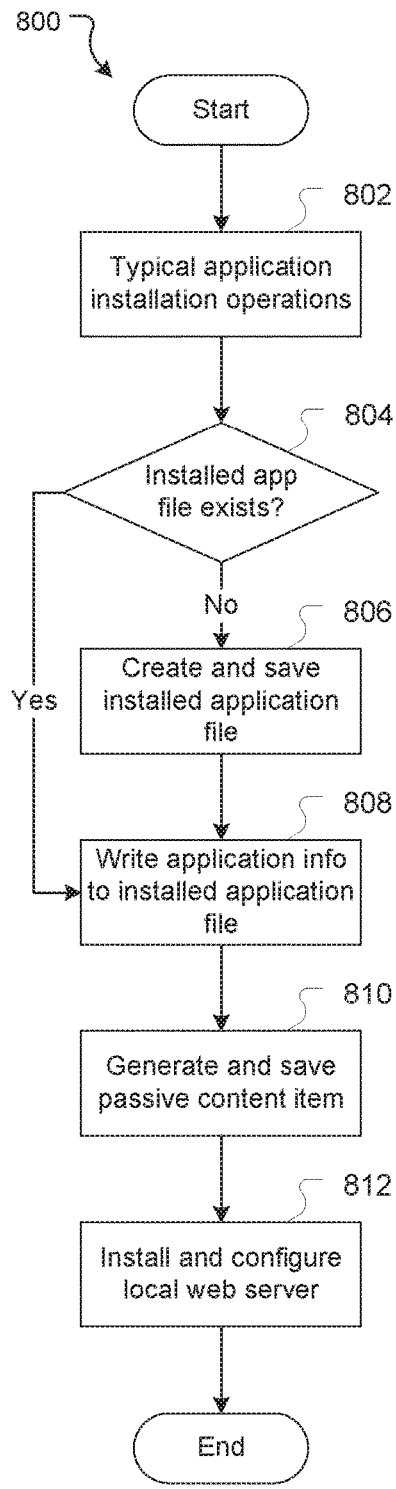
FIG. 8 is a flowchart illustrating processing involved in installing a dedicated desktop application in accordance with certain embodiments.

Turning to FIG. 8, a process 800 by which a dedicated desktop application such as application 224 or 225 is installed will be described. As with the single application scenario, the executable code for the application in question (i.e. execution of which causes the installation process to commence and that controls the installation process) may be provided to desktop system 220 in any appropriate manner—e.g. over a communication network or via a memory device/disk. Installation will again be described in the context of being controlled by an installation program.

At 802, typical installation operations for installation of the dedicated desktop application are performed. These steps will depend on the application in question, but typically involve generating/saving files and data required by the application in specific locations (specified by the end user or original programmer), creating registry entries in respect of the application, and creating launch links for the application (e.g. on a desktop or start menu).

At 804, the installation program checks a predefined memory location on the desktop system 210 to determine whether an installed application file 228 exists. The installed application file will exist if prior installation of another application has created the installed application file in the predefined memory location. By way of example, the predefined location may be a dedicated installed app directory—e.g. "c:/installed_app", however any location can be used.

If, at 804, the installation program determines that the installed application file does not exist processing continues to 806. Alternatively, if the installation program determines that the installed application file does exist processing continues to 808.

At 806, the installation program creates a new installed application file and saves it to the predefined memory location. If necessary, additional directories may also be created to provide the predefined memory location. Processing then continues to 808.

At 808, the installation program writes application details in respect of the application currently being installed to the installed application file. If the installed application file was only just created at 806 the application details will be the only details in the installed application file. If the installed application file existed prior to the installation of the instant application details of other applications should be stored in the file. In this case application details in respect of the instant application are added to the existing details, for example by appending them to the installed application file. In either case, the installed application file ends up recording details in respect of all dedicated desktop applications that are to be automatically detected and which have been installed.

Various formats for the application details are possible. In certain embodiments, the installed application file is a JSON file comprising an array of strings, each string in the array identifying a particular dedicated desktop application. Any identifier may be used for a given application provided it is unique (i.e. is not the same as the identifier of any other application). The string for an application may, for example, be the application name. Alternatively, a defined association between applications and corresponding identifier strings could be used—for example the Confluence application could be assigned string '0000', the Slack application '0001', the Jira application '0010', the Bitbucket application '0011', and so forth—each different application assigned a different binary sting.

At 810, the installation program generates a passive mixed content item 229 to be served by the local web server 226 (installed at 812). The installation program also saves the passive mixed content item 229 to memory accessible by the desktop system 220—e.g. local memory 110—in a defined passive mixed content location (e.g. in the same location as the installed application file—e.g. "c:/installed_app", however any location can be used). If a passive mixed content item 229 already exists in the defined passive mixed content location (e.g. due to earlier installation of another dedicated desktop application), the existing passive mixed content item 229 is overwritten with the newly created passive mixed content item.

Unlike the single application scenario described above, in the multi-application scenario the content of the passive mixed content item 229 is important. In the multi-application scenario, the installation program generates the passive mixed content item 229 to include installed application information (the installed application information taken or derived from the installed application file 228).

In certain embodiments, passive mixed content item 229 is an image and the information in respect of the installed dedicated desktop applications is encoded into the image by steganography.

Specifically, in certain embodiments the installed application file is converted into a binary string which is encoded into the binary data of the image. This can be achieved in various ways. By way of illustrative example, if the image in question was a very small 16×16 image it would have 256 pixels in total. In a standard uncompressed non-transparent image type, each pixel would be expressed by 3 bytes of information (one byte in respect of each color channel). A single pixel of the image, therefore could be represented as illustrated in Table B below:

TABLE B

| Example pixel representation | | | | | | | | |
|---|---|---|---|---|---|---|---|---|
| Red | 0 | 0 | 0 | 0 | 0 | 0 | 0 | 0 |
| Green | 0 | 1 | 0 | 1 | 0 | 0 | 1 | 0 |
| Blue | 1 | 1 | 0 | 0 | 1 | 1 | 0 | 0 |

Each colour channel byte has a most significant bit that has the most impact on the colour (e.g. the left most bit) and a least significant bit that has the least impact on the color (e.g. the right most bit).

If the binary string in respect of a particular installed application was '101', this could be encoded into the above pixel by replacing one or more bits of each byte representing the pixel with one or more bits from the installed application's binary string. For example, Table C below illustrates the example pixel of Table B with the binary string '101' encoded therein using only the least significant bits of each byte for the encoding (the encoded bits underlined for ease of identification):

TABLE C

| Example pixel with encoded binary string | | | | | | | | |
|---|---|---|---|---|---|---|---|---|
| Red | 0 | 0 | 0 | 0 | 0 | 0 | 0 | <u>1</u> |
| Green | 0 | 1 | 0 | 1 | 0 | 0 | 1 | <u>0</u> |
| Blue | 1 | 1 | 0 | 0 | 1 | 1 | 0 | <u>1</u> |

In one approach to steganography, the first 32 encoded bits in the content are used to tell the decoding system how many encoded bytes of data exist. While encoding using only the least significant bits is a common approach to steganography (in order to minimize/reduce the visual impact the encoded data has when the image is rendered as an image), this is not necessary for the present embodiments. In the present embodiments the image in question is never intended to be rendered as an image to be viewed by a user. Accordingly, provided the required header information remains intact (so the image data can still be loaded as an image and not fail for being an invalid file type), the rest of the image data can be used to 'encode' (or simply carry) the binary string: there is no need to be concerned with the visual impact of the string on the final image or, therefore, to limit encoding to least or lesser significant bits.

In order to extract information encoded in this manner, the relevant bits of the image data are extracted. For example, if only the least significant bits of each colour channel of each pixel were used for the encoding, then the least significant bits of each colour channel of each pixel are extracted.

Alternative processes for encoding data into images are possible.

At 812, the installation program causes a local web server 226 (e.g. an embedded HTTP server) to be installed and configured on the desktop system 220. This is similar to operation 306 described above with respect to the single application scenario. The local web server 226 is configured to serve the passive mixed content item 229 generated and saved at 810.

Installation process 800 is then complete.

4.2 Multi-Application Scenario: Application Uninstall

Figure 9:
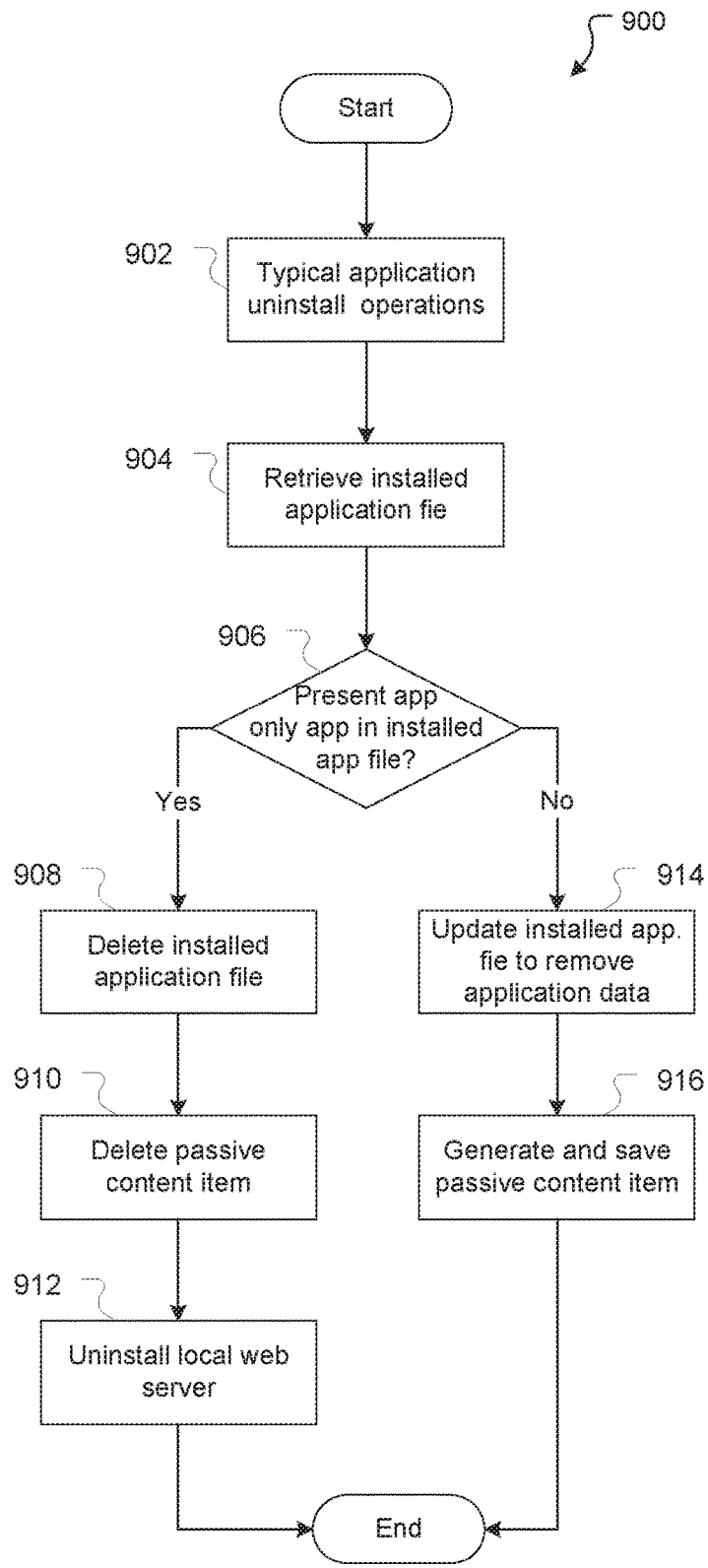
FIG. 9 is a flowchart illustrating processing involved in uninstalling a dedicated desktop application in accordance with certain embodiments.

Turning to FIG. 9, operations performed when (and if) a user uninstalls a dedicated desktop application such as 224 or 225 will be described. Once a command to uninstall the application has been received, the uninstall operations are controlled by the application being uninstalled (or an uninstaller associated with that application).

At 902, typical uninstallation operations for uninstalling of the dedicated desktop application are performed.

At 904, the uninstaller retrieves the installed application file 228.

At 906, the uninstaller processes the installed application file 228 to determine whether or not the application presently being uninstalled is the only application recorded in the installed application file.

If the uninstaller determines that application presently being uninstalled is the only application recorded in the installed application file, processing continues to 908. In this case, no other installed applications requiring automatic detection exist. Accordingly, at 908 the uninstaller deletes the installed application file 228, at 910 the uninstaller deletes the passive mixed content item 229, and at 912 the uninstaller causes the local web server 226 to be uninstalled. The uninstallation process is then complete.

If the application presently being uninstalled is not the only application recorded in the installed application file processing continues to 914. In this case, other installed applications requiring automatic detection do exist so the local web server is not uninstalled and the installed application file is updated rather than deleted.

At 914, the uninstaller updates the installed application file 228 to remove the entry/data in respect of the application being uninstalled.

At 916, the uninstaller causes a new passive mixed content item 229 to be generated using the updated installed application file 228. This effectively updates the passive mixed content item 229 so it no longer has any encoded information in respect of the application that is being uninstalled. Generation of the passive mixed content item 229 is as described with respect to operation 810 on installation of the application. The newly generated passive mixed content item 229 is then saved, overwriting the existing passive mixed content item. The uninstallation process is then complete.

4.3 Multi-Application Scenario: Independent Application Launch

Figures 10, 11:
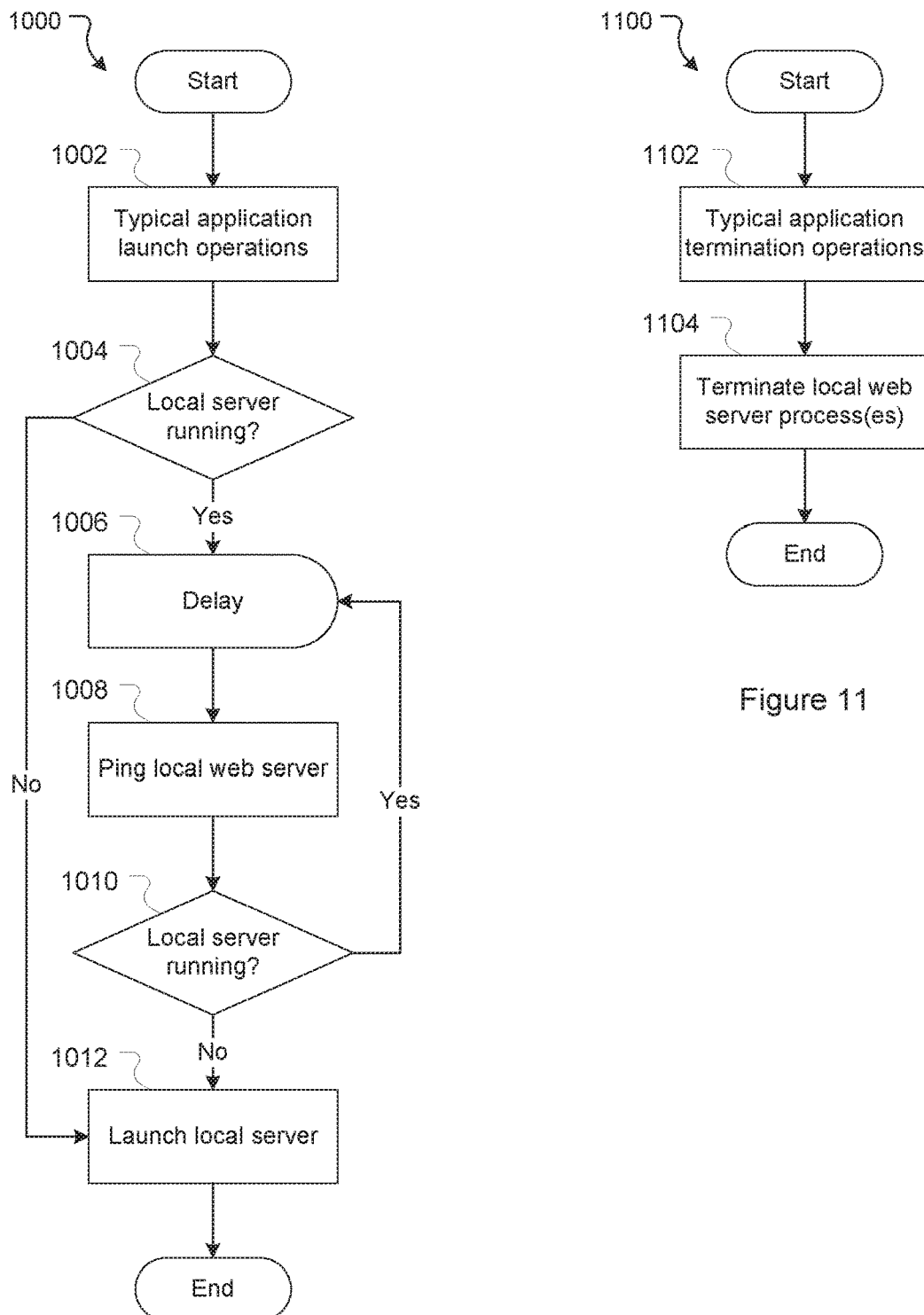
FIG. 10 is a flowchart illustrating processing involved in independent launch of a dedicated desktop application in accordance with certain embodiments.
FIG. 11 is a flowchart illustrating processing involved in termination of a dedicated desktop application in accordance with certain embodiments.

Turning to FIG. 10, operations performed when a dedicated desktop application such as 224 or 225 is independent launched will be described. As noted above, in this context independent launch is intended to distinguish over launch of the dedicated desktop application in response to automatic detection that the application exists (as described below).

Once a command to launch the application has been received, the launch operations are controlled by the launching application itself.

At 1002, the typical operations involved in launching the dedicated desktop application (as defined by the dedicated desktop application itself).

At 1004, desktop application checks to determine whether the local web server 216 is already running or not.

If the local web server 226 is already running processing continues to 1006. At 1006 the dedicated desktop application implements a delay. Following the delay, at 1008, the dedicated desktop application pings the local web server, and at 1010 determines (based on the response to the ping or lack thereof) whether the local web server 226 is still running or not. If the local web server 226 is not still running, the dedicated desktop application launches its own local web server at 1012 (discussed below). If, however, the local web server 226 is still running the dedicated desktop application returns to 1006 to delay before again checking whether the local web server is still running.

Processing steps 1006 and 1008 are periodically repeated by the application until either the application is terminated or the application determines that the local web server is no longer running and successfully starts up its own local web server.

If the local web server 226 is determined not to be running at either 1004 or 1010 processing proceeds to 1012 where the dedicated desktop application causes the local web server 226 to be launched. As with the single application scenario, launch of the local web server 226 may be in the background and its launch and running entirely transparent to the user. Once the local web server 226 has been launched it can receive and respond to requests to serve the passive mixed content item 229. The application launch is then complete.

As described above with respect to the single application scenario, in certain embodiments, the desktop system 220 may be configured to launch the local web server 226 automatically, and without requiring a user to manually launch a dedicated desktop application.

4.4 Multi-Application Scenario: Application Termination

Turning to FIG. 11, operations performed when a dedicated desktop application such as 224 or 225 is terminated will be described. Once a command to terminate has been received, termination is controlled by the terminating application itself.

At 1102, typical operations involved in terminating the dedicated desktop application in question are performed. These operations will depend on the application itself.

At 1104, the application causes the local web server 226 to be terminated. The application termination is then complete.

4.5 Multi Application Scenario: Automatic Application Detection

Figure 12:
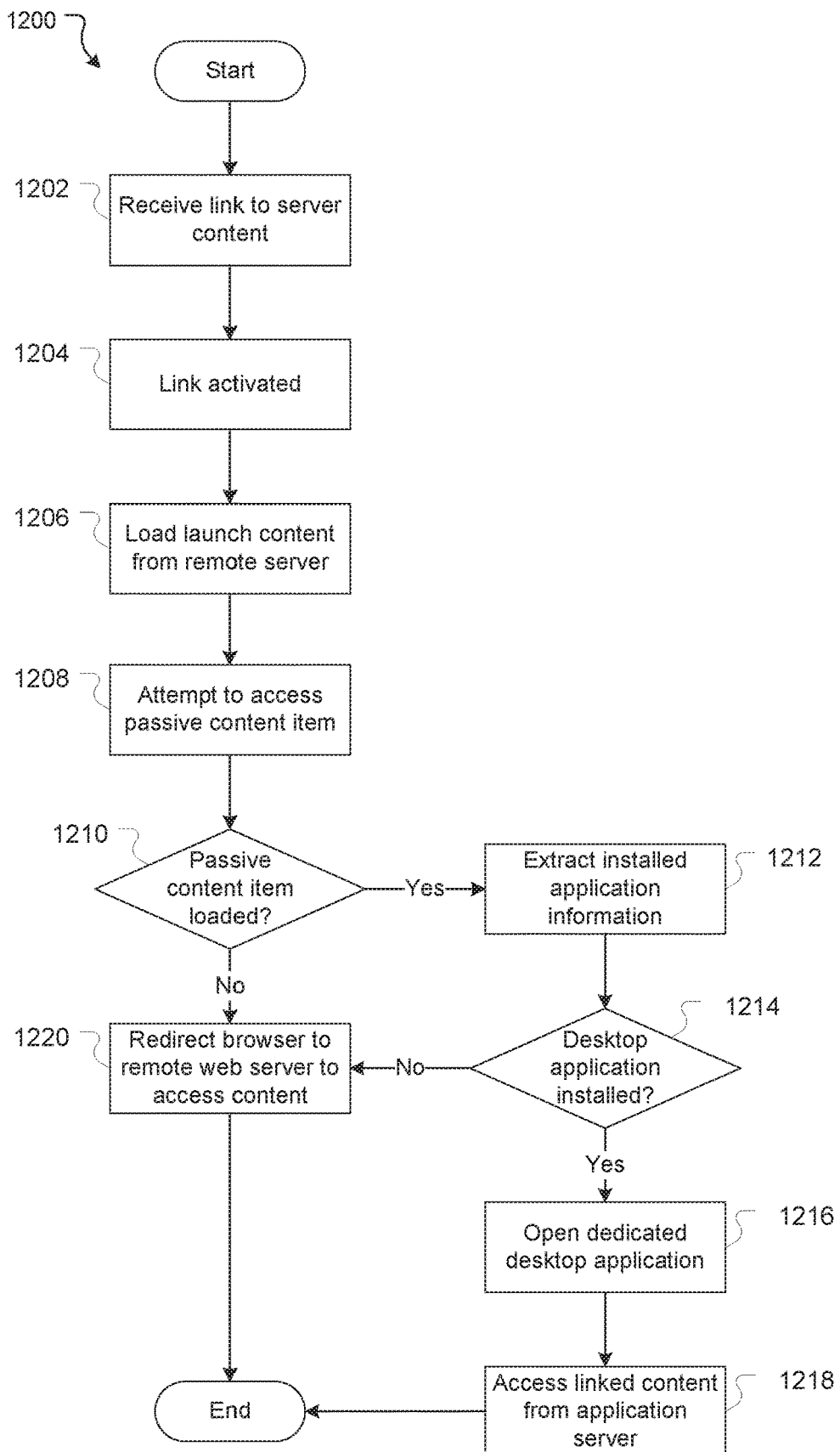
FIG. 12 is a flowchart illustrating processing involved in automatically detecting the installation of a dedicated desktop application in accordance with certain embodiments.

Turning to FIG. 12, operations 1200 performed to automatically detect the presence of a particular dedicated desktop application such as application 224 or 225 will be described.

At 1202, a link to content available from a particular server is received at the desktop system 220. As discussed above, the link will typically be a URL pointing to particular content made available by a remote server (e.g. remote web server 242 and/or application server 244), and may be received in/activated from a variety of applications.

At 1204, the link received at 702 is activated—for example by a user clicking or otherwise interacting with the link. If the link is being viewed/activated from a web browser 222, activation causes the web browser to process the link. If the link is being viewed/activated from a different application activation causes the operating system to open/launch the web browser 222 in order to process the link.

At 1206, in accordance with the activated link the web browser 222 loads launch content from a remote server (e.g. web server 242).

As with the single application scenario described above, the launch content loaded from the remote server includes a URL to the passive mixed content item 229 and launch logic. The launch logic causes the web browser 222 to: attempt to load the passive mixed content item 229 (at processing block 1208); determine whether the passive mixed content item 229 successfully loaded (at 1210); and to take action depending on the result of that determination. The launch content includes both a URI which can cause the appropriate dedicated desktop application to be launched in the event that the passive mixed content does load, and a URL pointing to the appropriate web server in the event that the passive mixed content does not load.

In certain embodiments, the launch content defines the passive mixed content item as hidden/invisible content: i.e. content that even if loaded does not display.

If, at 1210, the web browser 222 determines that the passive mixed content item 229 did successfully load, processing continues to 1212.

At 1212, the launch content causes the web browser 222 to process the passive mixed content item 229 to extract the installed application information encoded therein.

The manner in which the passive mixed content item 229 is processed to extract the installed application information will depend on the type of the passive mixed content item 229 and the manner in which the installed application information has been included or encoded therein. In the example above, where the passive mixed content item 229 is an image and the installed application information is encoded in the image by steganography, the installed application information is extracted by decoding the image binary data and extracting the one or more strings referencing installed applications that are encoded therein.

Once the installed application information has been extracted from the passive mixed content item, processing continues to 1214. At 1214, the launch content causes the web browser 222 to check the extracted installed application information to determine whether the relevant dedicated desktop application—i.e. the application capable of handling the link received at 1202—is indicated as being installed. If the application is not indicated as being installed, processing proceeds to 1220.

If, however, the extracted information does indicate that the dedicated desktop application capable of handling the link is installed on the desktop system 220, processing continues to 1216. At 1216 the launch content received from the remote server causes the web browser 222 to launch or open the relevant dedicated desktop application. This can be done, for example, by loading an appropriate URI handler for the dedicated desktop application in an iframe.

At 1218, the content referenced by the link is accessed from the relevant application server (e.g. application server 244) via the relevant dedicated desktop application (e.g. application 224) normally. Processing of the link received at 1202 is then complete (with the user able to interact further with the application server 244 via the relevant dedicated desktop application).

Processing step 1220 is reached if the passive mixed content item fails to load at all (determined at 1210) or if the passive mixed content item loads, but the installed application information included therein does not reference the dedicated desktop application required to handle the link received at 1202 (determined at 1214). Both of these cases indicate that the dedicated desktop application capable of handling the received link has not been installed. Accordingly, at 1210 the launch content causes the web browser 222 to redirect to the relevant remote web server (e.g. server 242) which serves the web interface relevant to the content referenced by the link. Processing of the link received at 1202 is then complete (with the user able to interact further with the remote web server via the web browser 222).

Once again, the operations performed following a user's activation of a received link (at 1204) are performed without requiring further user interaction, and can all be performed in the background (i.e. transparently to the user). As a consequence, once the user has activated the link at 1204 they are automatically directed to either the dedicated desktop application capable of handling the link (if that application is available), or if the dedicated application is not available to the web interface (through the web browser 222). Furthermore, by including installed application information in the passive mixed content item (e.g. by encoding it in an image using steganography processes) the operations described in this section can be used to automatically detect installation of any number of dedicated desktop applications.

4.6 Multi-Application Scenario: Embodiments

Example embodiments relevant to the single application scenario are set out in the following numbered clauses:

Clause 1. A computer implemented method comprising:
receiving a link to content served by a remote server;
detecting activation of the link;
in response to detecting activation of the link, attempting to load a passive mixed content item from a local web server;
determining whether the passive mixed content item successfully loaded;
in response to determining the passive mixed content item successfully loaded:
  extracting installed application information from the passive mixed content item;
  determining whether or not the installed application information extracted from the passive mixed content item indicates a relevant installed desktop application, the relevant installed desktop application being an installed application that is capable of accessing the content referenced by the link from a remote application server;
  in response to determining the installed application information extracted from the passive mixed content item does indicate a relevant dedicated desktop application, accessing the content referenced by the link from the remote application server using the relevant installed desktop application.

Clause 2. The computer implemented method of clause 1, wherein in response to determining the passive mixed content item did not successfully load, the method further comprises accessing the content referenced by the link from a remote web server using a web browser application.

Clause 3. The computer implemented method of clause 1, wherein in response to determining the installed application information extracted from the passive mixed content item does not indicate a relevant dedicated desktop application, the method further comprises accessing the content referenced by the link from a remote web server using a web browser application.

Clause 4. The computer implemented method of clause 1, wherein accessing the content referenced by the link from the remote application server using the relevant installed desktop application comprises automatically launching the relevant installed desktop application.

Clause 5. The computer implemented method of clause 1, wherein accessing the content referenced by the link from the remote application server using the relevant installed desktop application comprises opening an instance of the relevant installed desktop application that is already running.

Clause 6. The computer implemented method of clause 1, wherein the passive mixed content item is an image.

Clause 7. The computer implemented method of clause 1, wherein the installed application information is encoded in the passive mixed content item using steganography techniques.

Clause 8. The computer implemented method of clause 1, wherein the local web server is a non-secure server and the passive mixed content is served over HTTP.

Clause 9. The computer implemented method of clause 1, wherein the passive mixed content item is generated and saved by the installed dedicated desktop application.

Clause 10. The computer implemented method of clause 1, wherein the local web server is an embedded webserver.

Clause 11. The computer implemented method of clause 10, wherein the embedded webserver is embedded in the installed dedicated desktop application.

Clause 12. The computer implemented method of clause 1, wherein independent launch of the installed dedicated desktop application causes the local web server to be launched.

Clause 13. The computer implemented method of clause 1, wherein the passive mixed content item is a hidden content item that does not display even if successfully loaded.

Further example embodiments extend to systems comprising one or more processors; and one or more non-transitory computer-readable storage media storing sequences of instructions which, when executed by the one or more processors, cause the one or more processors to perform the computer implemented method of any of clauses 1 to 12 above.

Further example embodiments extend to non-transitory computer-readable storage media storing sequences of instructions which, when executed by one or more processors, cause the one or more processors to perform the computer implemented method of any of clauses 1 to 12 above.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

A number of flowcharts have been provided in order to illustrate processing or functional steps. Although these flowcharts define steps in particular orders to explain various features in some cases the steps may be able to be performed in a different order. Furthermore, in some cases one or more steps may be combined into a single step, a single step may be divided into multiple separate steps, and/or the function(s) achieved by one or more of the described/illustrated steps may be achieved by one or more alternative steps.

As used herein the terms "include" and "comprise" (and variations of those terms, such as "including", "includes", "comprising", "comprises", "comprised" and the like) are intended to be inclusive and are not intended to exclude further features, components, integers or steps.

It will be understood that the embodiments disclosed and defined in this specification extend to all alternative combinations of two or more of the individual features mentioned or evident from the text or drawings. All of these different combinations constitute various alternative aspects of the embodiments.

What is claimed is:

1. A computer implemented method comprising:
   receiving a link to content served by a remote server;
   detecting activation of the link;
   in response to detecting activation of the link, attempting to load a passive mixed content item from a local web server, the passive mixed content item comprising an image; and
   upon determining the passive mixed content item has successfully loaded:
      extracting installed application information from the passive mixed content item;
      determining whether or not the installed application information extracted from the passive mixed content item indicates a relevant installed desktop application, the relevant installed desktop application being an installed application that is capable of accessing the content referenced by the link from a remote application server; and
      upon determining the installed application information extracted from the passive mixed content item indicates a relevant installed desktop application, accessing the content referenced by the link from the remote application server using the relevant installed desktop application.

2. The computer implemented method of claim 1, wherein in response to determining the passive mixed content item did not successfully load, the method further comprises accessing the content referenced by the link from a remote web server using a web browser application.

3. The computer implemented method of claim 1, wherein in response to determining the installed application information extracted from the passive mixed content item does not indicate a relevant installed desktop application, the method further comprises accessing the content referenced by the link from a remote web server using a web browser application.

4. The computer implemented method of claim 1, wherein accessing the content referenced by the link from the remote application server using the relevant installed desktop application comprises automatically launching the relevant installed desktop application.

5. The computer implemented method of claim 1, wherein accessing the content referenced by the link from the remote application server using the relevant installed desktop application comprises opening an instance of the relevant installed desktop application that is already running.

6. The computer implemented method of claim 1, wherein the passive mixed content item is an image.

7. The computer implemented method of claim 1, wherein the installed application information is encoded in the passive mixed content item using steganography techniques.

8. The computer implemented method of claim 1, wherein the local web server is a non-secure server and the passive mixed content item is served over HTTP.

9. The computer implemented method of claim 1, wherein the passive mixed content item is generated and saved by the relevant installed desktop application.

10. The computer implemented method of claim 1, wherein the local web server is an embedded webserver.

11. The computer implemented method of claim 10, wherein the embedded webserver is embedded in the relevant installed desktop application.

12. The computer implemented method of claim 1, wherein independent launch of the relevant installed desktop application causes the local web server to be launched.

13. The computer implemented method of claim 1, wherein the passive mixed content item is a hidden content item that does not display even if successfully loaded.

14. A system comprising:
   one or more processors;
   one or more non-transitory computer-readable storage media storing sequences of instructions which, when executed by the one or more processors, cause the one or more processors to:
   receive a link to content served by a remote server;
   detect activation of the link;
   in response to detecting activation of the link, attempt to load a passive mixed content item from a local web server, the passive mixed content item comprising an image;
   determine whether the passive mixed content item successfully loaded; and
   in response to determining the passive mixed content item successfully loaded:
      extract installed application information from the passive mixed content item;
      determine whether or not the installed application information extracted from the passive mixed content item indicates a relevant installed desktop application, the relevant installed desktop application being an installed application that is capable of accessing the content referenced by the link from a remote application server; and
      in response to determining the installed application information extracted from the passive mixed content item does indicate a relevant installed desktop application, access the content referenced by the link from the remote application server using the relevant installed desktop application.

15. The system of claim 14, wherein accessing the content referenced by the link from the remote application server using the relevant installed desktop application comprises automatically launching the relevant installed desktop application.

16. The system of claim 14, wherein the installed application information is encoded in the passive mixed content item using steganography techniques.

17. The system of claim 14, wherein the local web server is a non-secure server and the passive mixed content item is served over HTTP.

18. The system of claim 14, wherein the local web server is an embedded webserver.

19. The system of claim 14, wherein the passive mixed content item is a hidden content item that does not display even if successfully loaded.

20. One or more non-transitory computer-readable media storing instructions which, when executed by one or more processors, cause the one or more processors to:

receive a link to content served by a remote server;

detect activation of the link;

in response to detecting activation of the link, attempt to load a passive mixed content item from a local web server, the passive mixed content item comprising an image;

determine whether the passive mixed content item successfully loaded; and in response to determining the passive mixed content item has successfully loaded:

extract installed application information from the passive mixed content item; determine whether or not the installed application information extracted from the passive mixed content item indicates a relevant dedicated desktop application, the relevant dedicated desktop application being an installed application that is capable of accessing the content referenced by the link from a remote application server; and in response to determining the installed application information extracted from the passive mixed content item does indicate a relevant dedicated desktop application, access the content referenced by the link from the remote application server using the relevant dedicated desktop application.

* * * * *